United States Patent
Luccisano et al.

(10) Patent No.: US 7,721,318 B2
(45) Date of Patent: May 18, 2010

(54) UPLINK SIGNALING FOR GLOBAL DECODER CONTROL

(75) Inventors: Alexander Luccisano, Ajax (CA); Wayne Steven Sheldrick, Whitby (CA); Keith B. Gammie, Markham (CA); Arthur San Woo, Scarborough (CA); Brian Crookes, Toronto (CA)

(73) Assignee: Scientific-Atlanta, Inc., Lawrenceville, GA (US)

( * ) Notice: Subject to any disclaimer, the term of this patent is extended or adjusted under 35 U.S.C. 154(b) by 1406 days.

(21) Appl. No.: 10/907,792

(22) Filed: Apr. 15, 2005

(65) Prior Publication Data

US 2006/0236334 A1 Oct. 19, 2006

(51) Int. Cl.
*H04N 7/173* (2006.01)

(52) U.S. Cl. ............. 725/146; 725/144; 725/145; 725/116

(58) Field of Classification Search ............ 725/116, 725/114, 115, 146, 145, 147

See application file for complete search history.

(56) References Cited

U.S. PATENT DOCUMENTS

| | | | | | |
|---|---|---|---|---|---|
| 4,625,235 | A | * | 11/1986 | Watson | 725/144 |
| 4,985,895 | A | * | 1/1991 | Pelkey | 714/758 |
| 5,029,232 | A | * | 7/1991 | Nall | 725/68 |
| 5,235,643 | A | * | 8/1993 | Anderson et al. | 380/210 |
| 5,600,364 | A | * | 2/1997 | Hendricks et al. | 725/9 |
| 5,600,573 | A | * | 2/1997 | Hendricks et al. | 725/116 |
| 5,659,350 | A | * | 8/1997 | Hendricks et al. | 725/116 |
| 5,892,910 | A | * | 4/1999 | Safadi | 725/119 |
| 2002/0184643 | A1 | * | 12/2002 | Fichet | 725/116 |
| 2003/0056218 | A1 | * | 3/2003 | Wingard et al. | 725/46 |
| 2004/0015999 | A1 | * | 1/2004 | Carlucci et al. | 725/136 |
| 2004/0068751 | A1 | * | 4/2004 | Basawapatna et al. | 725/117 |
| 2004/0181810 | A1 | * | 9/2004 | Pelkey et al. | 725/116 |

FOREIGN PATENT DOCUMENTS

| | | |
|---|---|---|
| EP | 0 450 841 | 10/1991 |
| EP | 0 679 027 | 10/1995 |
| EP | 0 866 615 | 9/1998 |
| GB | 2 296 171 | 6/1996 |

OTHER PUBLICATIONS

"Functional Model of a Conditional Access System" EBU Review—Technical, European Broadcasting Union. Brussels, BE, No. 266 Dec. 21, 1995, pp. 64-77, XP000559450 ISSN: 0251-0936.

(Continued)

*Primary Examiner*—Brian T Pendleton
*Assistant Examiner*—Fernando Alcon
(74) *Attorney, Agent, or Firm*—Tarolli, Sundheim, Covell & Tummino LLP

(57) ABSTRACT

Uplink signaling for controlling a plurality of decoders at a remote site. An uplink has a control server for controlling a storage system of the decoders at the remote site. The control server of the uplink controls the storage system by injecting at least one global control stream multiplexed with a transport stream. The transport multiplexed with the global control stream is formed at the uplink for controlling the decoders simultaneously.

21 Claims, 6 Drawing Sheets

OTHER PUBLICATIONS

Giachetti J-L et al: "A Common Conditional Access Interface for Digital Video Broadcasting Decoders" IEEE Transactions on Consumer Electronics, IEEE Service Center, New York, NY, US, vol. 41, No. 3, Aug. 1995, pp. 836-841, XP000539543 ISSN: 0098-3063.

Van Schooneveld D: "Standardization of conditional access system for digital pay television" Philips Journal of Research, Elsevier, Amsterdam, NL, vol. 50, No. 1, 1996, pp. 217-225, XP004008213 ISSN: 0165-5817.

* cited by examiner

UPLINK SIGNALING FOR GLOBAL DECODER CONTROL

CROSS-REFERENCE TO RELATED PATENT APPLICATIONS

The present U.S. application is related to U.S. applications entitled "CONTROL SYSTEM WITH GLOBAL CONTROL STREAM FOR CONTROLLING A PLURALTY OF DECODERS" with application Ser. No. 10/907,791, and "STORAGE CONTROL SYSTEM" with application Ser. No. 10/907,799, which are incorporated herein by reference, and have been filed concurrently with the present application.

FIELD OF THE INVENTION

This invention relates in general to broadband communications systems, and more particularly, to the remote signaling from an uplink to a decoder for the purpose of program scheduling and coordinating decoder controllers.

DESCRIPTION OF THE RELATED ART

Hybrid fiber/coax (HFC) broadband networks contain four primary components: the headend, the AM fiber optic link, the distribution plant, and customer premises. The most important is the headend, where signals from multiple sources are received and are conditioned or cleaned up and placed on an RF carrier. Once signals have been prepared for delivery, they are combined onto a single cable and are ready to be sent over the network. The three most common types of signals received at the headend include off-air signals, satellite signals, and local origination signals. However, satellite signals are the most common type of signal passing through the headend. Satellite signals include any signal transmitted from an earth station to an orbiting satellite, then retransmitted back down to earth. Satellite signals follow three route segments from the transmitting earth station to the receiving earth station. First, signals are transmitted from earth to an orbiting satellite on a path referred to as the uplink; signals are received by a transponder on a satellite; signals are retransmitted from the transponder to a receiving earth station over the downlink. The transponder amplifies the incoming signal and changes its frequency for the downlink journey to avoid interference with uplink signals.

FIG. 1 illustrates a satellite broadcast network 100. At the uplink facility 110, program content is stored on video servers controlled by a broadcast automation system. Any analog content at the network playout center is compressed using encoders and then multiplexed with the content delivered from the video file servers. The Network Operations Center (NOC) 120 is responsible for overall control and co-ordination of the uplink and the downlink sites. The headend 130 may include one or more server devices for providing broadband signals, such as video, audio, and/or data signals. The headend 130 has numerous decoders 140 which preferably each have a mass storage device 150, such as a hard disk drive.

The addition of mass storage devices in the digital television broadcast distribution network enables new applications and enhances existing ones. The headend would have the ability to store programs for delayed playback which allows customers to reduce the bandwidth requirements necessary for live playback.

BRIEF DESCRIPTION OF THE DRAWINGS

The invention can be better understood with reference to the following drawings. The components in the drawings are not necessarily drawn to scale, emphasis instead being placed upon clearly illustrating the principles of the invention. In the drawings, like reference numerals designate corresponding parts throughout the several views.

DETAILED DESCRIPTION

The embodiments of the invention can be understood in the context of a broadband communications system. Note, however, that the invention may be embodied in many different forms and should not be construed as limited to the embodiments set forth herein. For example, transmitted broadband signals may include at least one of video/audio, telephony, data, or Internet Protocol (IP) signals, to name but a few. All examples given herein, therefore, are intended to be non-limiting and are provided in order to help clarify the description of the invention.

Figure 1:
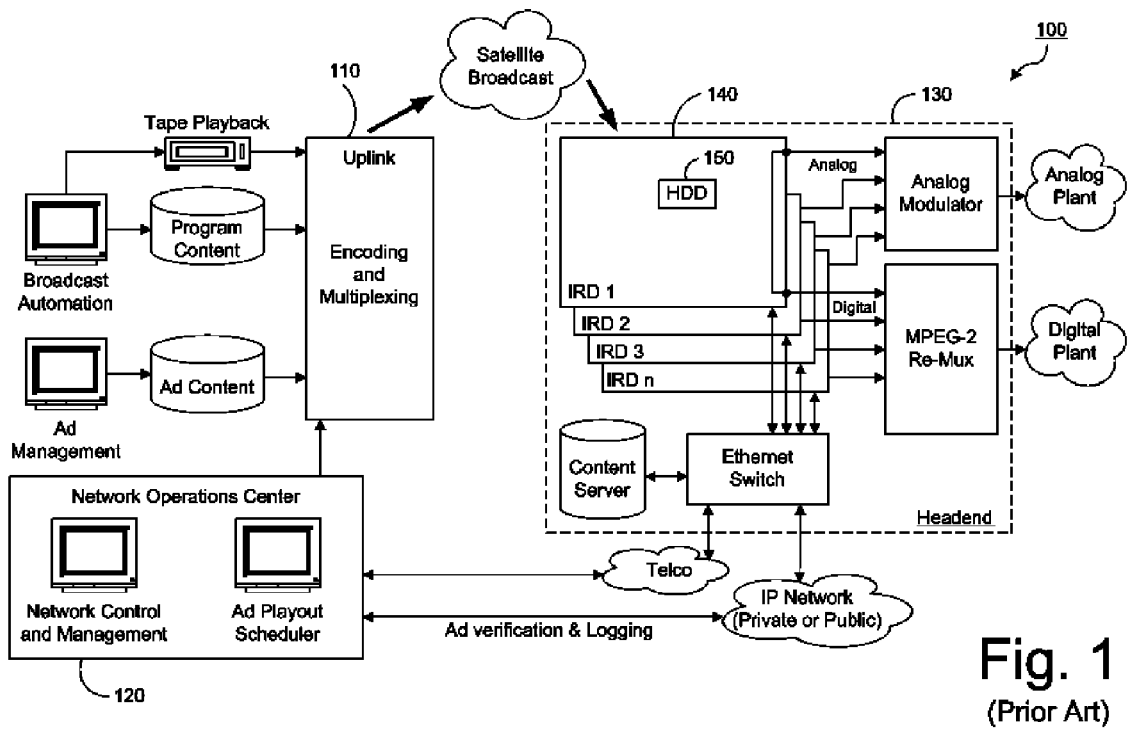
FIG. 1 illustrates a satellite broadcast system.
Figure 2:
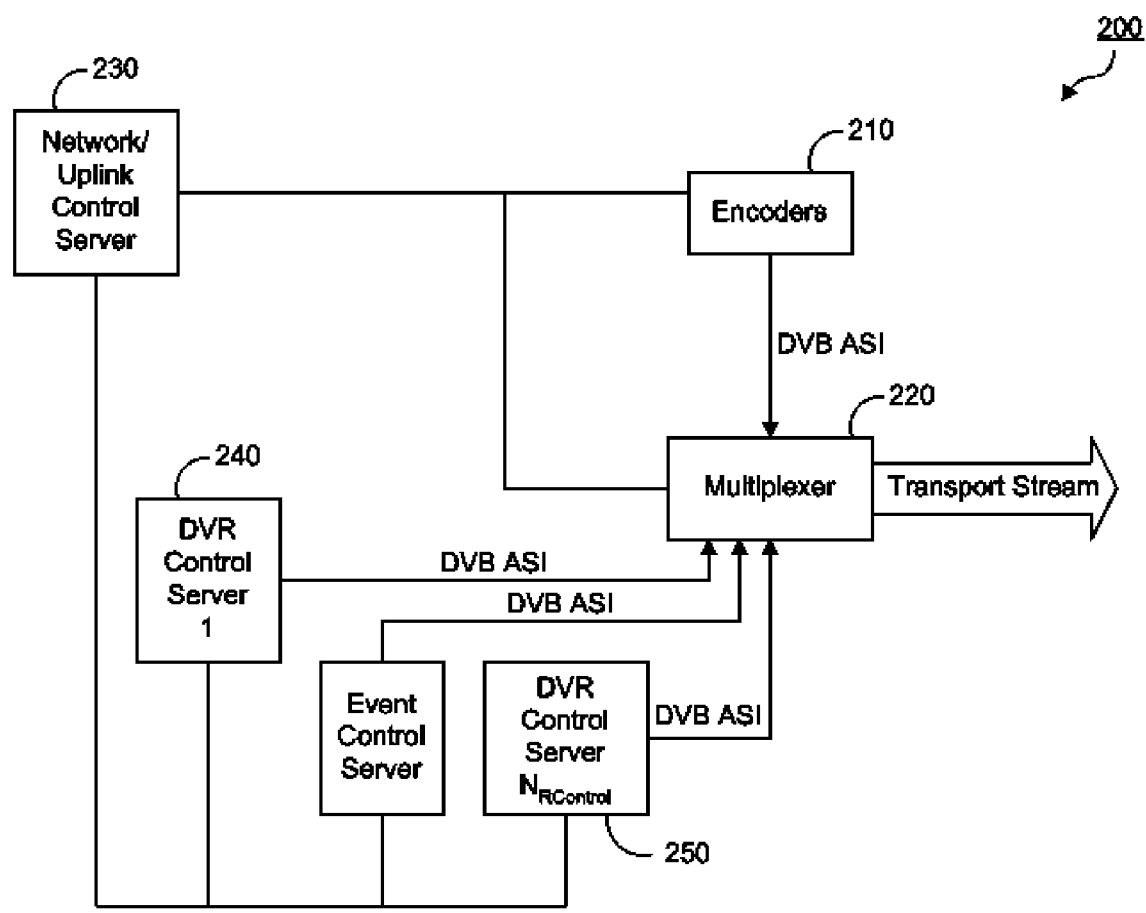
FIG. 2 illustrates one embodiment of a general uplink system.

FIG. 2 illustrates a generalized model of an uplink 200 that consists of functional components that perform specific duties. For example, an encoder 210 takes raw program input and encodes it into another format for output. It may take video and audio and encode it using an MPEG compliant algorithm, or it may take IP packets via Ethernet and encode it using DVB MPE.

The generalized uplink 200 consists of encoders 210 used to encode programs for insertion into the transport stream and a multiplexer 220 to combine programs from the encoders 210 to form the transport stream. An uplink control server 230, such as a Network Centre Server, manages the uplink devices and configures the decoders 300 (FIG. 3) to listen to a selected set of global control streams, such as storage control stream (SCS) remote control streams. DVR control servers 240, 250 inject global control streams to control operation of the decoders 300, such as the operation of the program storage system. In one embodiment, the uplink 200 may also include a file distribution DVR control server.

For example, because the control data stream is global, a plurality of decoders may be controlled simultaneously. Also, the addition of storage devices to the decoders helps to reduce and manage the amount of bandwidth required over the satellite transmission. Decoders with a storage system allow for program regionalization where an entire program is substituted to overcome rights restrictions in particular locations as well as inject local stories and news. The storage system also allows for storing of programs transmitted to the headend prior to their scheduled playout time, but which may then be played out later during the scheduled time. This may be referred to as "store and forward". For example, a program is stored for time zone delay or for multiple playbacks in a short amount of time.

The present invention includes a control system for controlling groups of decoders simultaneously. A global control data stream is a collection of data used for global applications. This data stream is global in the sense the data is not addressed to any individual decoder or to any particular group of decoders as is an entitlement management message (EMM). There are preferably at least three global control data streams—disaster recovery, live event control, and storage control. The streams may exist on a shared or independent PID. The global control data stream is a set of messages that are multiplexed into all signals of a network. A global control data controller is able to produce messages on the global PID on demand. The command to produce a message may come from a human operator pushing a button in a control room, from an Automation System or time scheduled. Commands can be sent once or repetitively.

The decoder is initialized using the control system initialization EMM before it can respond to any control stream. This EMM delivers the network's Customer Code and the control system Ids. Control system Ids exist for each control system: the storage control system (SCS_Id), event control system (ECS_Id) and disaster recovery system (DR_Id). The Customer Code is a unique number assigned to each customer that has independent networks. If the decoder's Customer Code does not match the one on transmission, then either the decoder has not been initialized or the decoder has changed networks. If the control system Id does not match, then it is possible that there are multiple global control data streams on transmission for a particular customer.

Groups are assigned to a decoder as a block. Given the preference of unlimited groups, the current recommendation is for the decoder to support the storage of all available groups. The EMM can deliver up to 10 groups at a time. The decoder caches the group codes delivered in multiple EMMs until all have been received. When we are sure a complete set has been received, they are written to non-volatile memory. All groups assigned to a decoder have equal priority, as far as the targeting system is concerned. When an event control table (ECT) is received, the decoder checks for group code matches. Any group code either matches or does not match. There is no dependency on other group codes in deciding a match.

One aspect of the control system is group targeting. A control table of the global control data stream contains a list of subscriber group code matching instructions and each one must be checked against the set of decoder group codes. If a particular decoder is "targeted" then it performs the associated action. Targeting a decoder follows a simple matching algorithm. The targeting system is order dependent. The uplink systems creating the stream and the decoders consuming the stream, implement the same algorithm. For this algorithm, the term targeted means that a particular decoder will implement an action. Any decoder not targeted will not be affected in any way by the actions received. The common control syntax consists of two loops. The first loop provides the targeting list and the second provides the list of actions. Inside the first loop are descriptors and each descriptor provides a list of group codes. A descriptor is of limited size so it may be necessary to use multiple descriptors. Multiple descriptors are required to implement some more complex grouping methods.

Group targeting should follow these general rules. All decoders start not targeted. The descriptor may direct all decoders to change its targeted state relative to the previous calculated value. Before a descriptor is processed, the current targeted state may be the same as it was at the end of the previous descriptor or inverted relative to what it was at the end of the previous descriptor. Each group code listed may change the current targeted state through one of the following tests: make a decoder targeted if the group code matches; make a decoder not targeted if the group code matches; or make no change to the targeted state if the group code does not match.

The concept for this system is a single variable used to hold the decoders targeted state. This variable is initialized to not target when a new control table arrives to be processed. The state is modified first by the global control data stream and then by each group code and matching instruction listed in the descriptor. This is repeated for each descriptor in the first loop. When all descriptors have been processed, the variable will be in one of two states, targeted or not targeted. If it is targeted, then the actions listed in the second loop are to be executed. If it is not targeted, then the decoder takes no action.

The control table delivers a list of actions that are to be executed if targeted. One action typically associated with an event control system is the force tune feature. A storage control system would typically issue actions of acquire or play out.

Figure 3:
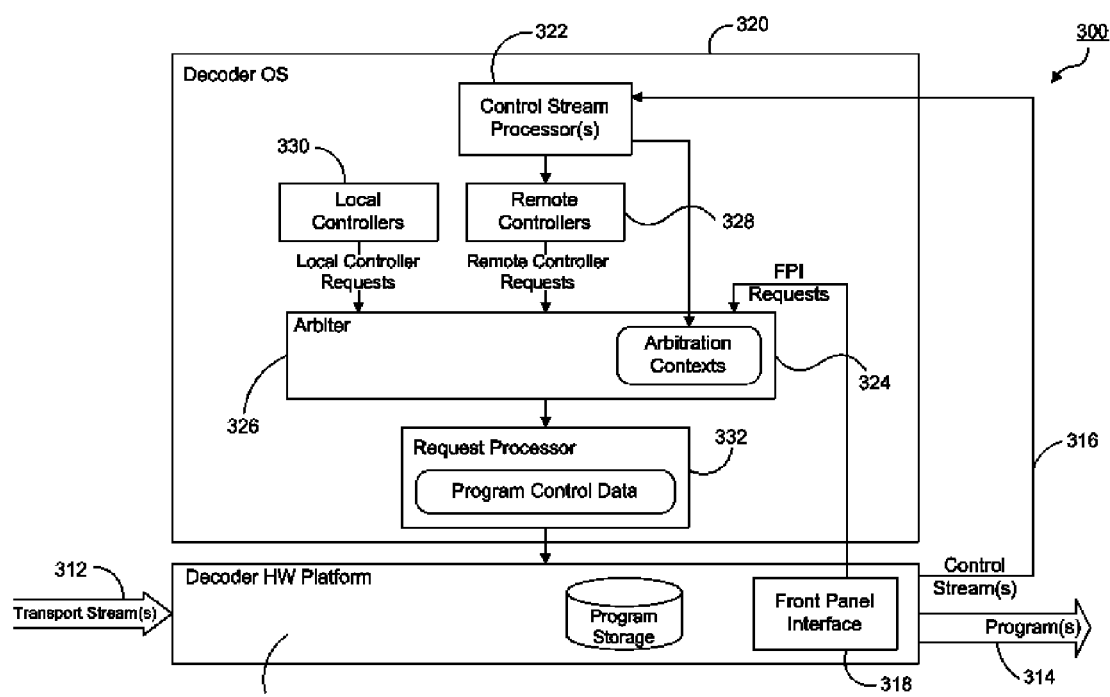
FIG. 3 illustrates one embodiment of a decoder with a hardware and software platform.

In one embodiment, still referring to FIG. 2, the DVR control server 240 injects a global control data stream, such as the storage control stream for directing the actions of the storage enabled decoders 300, shown in FIG. 3. The storage control stream may carry one or more of a Content Control Table (CCT), an Acquisition Control Table (ACT), and a Playout Control Table (PCT). Each of the tables share syntax and may contain specific types of action descriptors. The CCT is used to deliver the content that is expected to exist on a decoder now or in the future. Any content that is network controlled, but not listed in this table, is to be deleted from the decoder storage. The content may consist of video and audio content remotely triggered for acquisition. The decoder 300 will create an entry in its directory for each content description. When a playback command is given, the decoder 300 needs to determine if the content requested has actually been acquired or not. If the content reference id matches a previous directory entry, then this indicates that the entry should be renamed with the new information.

A content reference consists of two parts—the data that is delivered to the decoder 300 and the data that is locally managed on the hard drive 150. The CCT may be used to reserve disk space for high priority acquisitions and for storing local content from an Ethernet port or triggered by the front panel interface 318 (FIG. 3) independent of the global data stream control. The downloaded information is the content reference id, the filename the decoder 300 should use, the service id to tune to for live playout, the content type selector, and the expiry date. The locally maintained information is whether the content is present and the actual size of the content. Content deletion occurs if there is no entry in any new CCT. The CCT will always be sent as a complete table and may require multiple sections to deliver all of the information. The decoder 300 acquires all sections and save the information in temporary storage until it is complete. The table also contains a version number. If this value changes, then any in-progress download of the CCT should be restarted. If the version is the same as the previous table processed, the decoder 300 should be able to ignore it, since it is the same data. To avoid possible timing problems, there should be some hysteresis provided before deleting a file. The decoder 300 should flag a file for delete and only perform the actual delete after a predetermined time, or after processing two complete CCT downloads for verification, or some similar type of self-check.

The ACT provides the date, time, and duration for a network controlled acquisition. Since the filename is delivered in the CCT, it is possible that there is no entry present at the time of the record. This could be due to a slow update of a CCT and a "record now" request. Less likely is an error in formatting the CCT or missed updates by the decoder. To alleviate this problem, the ACT will contain a copy of the filename and expiry date. This should be used only if there is no entry in the local CCT. The ACT data would be updated when the actual content control data finally arrives. One concern with this duplicate data is the waste of bandwidth with long filenames. In one embodiment, the ACT will send a temporary unique filename and the real filename will be sent in the CCT and renamed upon arrival. The ACT will support recording of live content from a local source, such as an RF tuner, DVB ASI input, or a special IP transport input. Content may also be copied from an existing file, a text message embedded in the ACT, or a URL addressed to content from a source connected to the decoder's Ethernet port. The date and time provides an exact time to start recording. The duration in the ACT provides the record time window. The actual number of frames recorded is saved by the decoder. The duration in the ACT is only of use to schedule recording. In addition to triggering the requests of content based upon a time window, the recording can also be triggered by uplink signaling embedded in the program such as cue triggers or digital program insertion (DPI) messages, uplink signaling embedded in the program within a time window, or a front panel input within a time window.

The PCT provides the date, time, and window for all scheduled playout sessions. The playout content includes live program content, stored program content, text messages embedded in the PCT, and text messages in a file. There are additional controls to allow for playout of a partial file, such as indexed into the file, for example, starting the playout other than at the beginning, and to loop the file, such as playing the content repetitively within a time window. The window provides the time over which a playout should occur. However, the actual content may be less than, the same length, or longer than the window. When less, the decoder will need to fill the time with some default content until the window expires. If the content is too long, it should simply stop playing the content and return to the default content or follow on content that may be specified. If the PCT does not specify any playout, default playout instructions, such as displaying a text message or tuning to a channel to playout a specific file, are followed.

Disaster recovery applications include alternative mapping services. For example, if a normally tuned signal is lost for a period of time, a backup service would be desired. The backup service would tune the lost signal through an alternative satellite or carrier.

Event control applications include live programming such as sports, for example, which allows realtime force tuning of groups of decoders to follow regionalized sporting events or to provide alternate programs where rights restrictions prevent viewing of the sporting event.

The event control system, utilizing the global event control stream, is intended to force tune a plurality of decoders simultaneously. Authorization is normally an EMM function. However, the normal force tune operation using EMM distribution has too large a latency between when the first decoder and the last decoder retune. In addition to force tune, it is desirable to control the authorization state of the decoder. Deauthorizing a decoder may be referred to as "blocking". Both event control and blocking are controlled by the global control data stream. However, the setup of the feature (i.e. Assigning group membership to subscribers and decoders) is preferably still done using EMM distribution.

Referring to FIG. 3, the decoder 300 includes a hardware platform 310 and a software platform 320. The decoder hardware platform 310 takes in one or more transport streams 312 and plays out one or more programs 314. The decoder hardware platform 310 provides one or more of the controls streams 316 to the decoder operating system 320 and has a front panel interface 318 that is used to submit the requests to the decoder operating system 320. The decoder operating system 320 has one or more control streams processors 322 to extract and forward arbitration contexts 324 to an arbiter 326 to resolve conflicting requests from controllers using the arbitration contexts 324, and requests to perform decoder functions to a remote controller 328 which submits the requests. The decoder operating system 320 also has local controllers 330 to manage login sessions into the decoder 300 and a requests processor 332 to handle the requests from controllers producing program control data that is used to control the decoder hardware platform 310.

Figure 4:
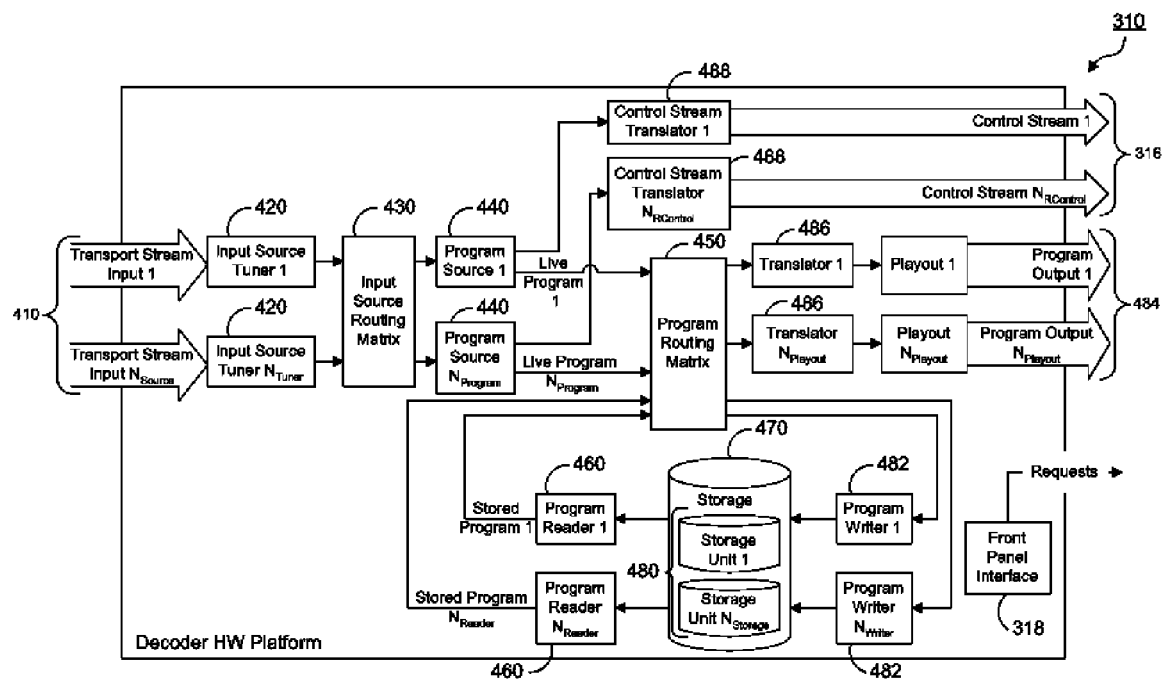
FIG. 4 illustrates one embodiment of a hardware platform for the decoder of FIG. 3.

FIG. 4 illustrates one embodiment of the decoder hardware platform 310 in more detail where there are multiple transport stream inputs 410. The input source tuners 420 take one or more transport streams inputs 410 and produce a single transport stream output to the input source routing matrix 430. The input source routing matrix 430 outputs the transport streams. Each output is capable of selecting any of the inputs and is capable of being sent to a program source 440. The program sources 440 are used to send a live program to the program routing matrix 450. The program can be sourced from the transport stream by its service ID or sourced from content injected by the decoder operating system 320. The program source 440 can also provide the SCS control streams. Any SCS control stream in the transport stream may be extracted and sent to the decoder operating system 320. It can be selected by its own service ID or included in the service ID of the live program. The program routing matrix 450 has an input for the program source 440 and the program reader 460. The program routing matrix 450 also has an output for each program play out and program write and is capable of selecting from any input.

The decoder hardware platform 310 also has a storage system 470 which includes multiple storage units 480 and a program writer 482 capable of writing a program into a storage unit and a program reader 460. The program outputs 484 are produced by a translator 486 used to convert from multiple native program formats to a single playout format. The program output 484 can also be produced by a playout to output, and the program is groomed, such as output mapping and routing, to a form that can be consumed by external equipment. Control stream translators 488 are used to convert the raw control streams to a form that can be used by the decoder operating system 320. The front panel interface 318 can be used to submit the requests to the decoder operating system 320.

Figure 5:
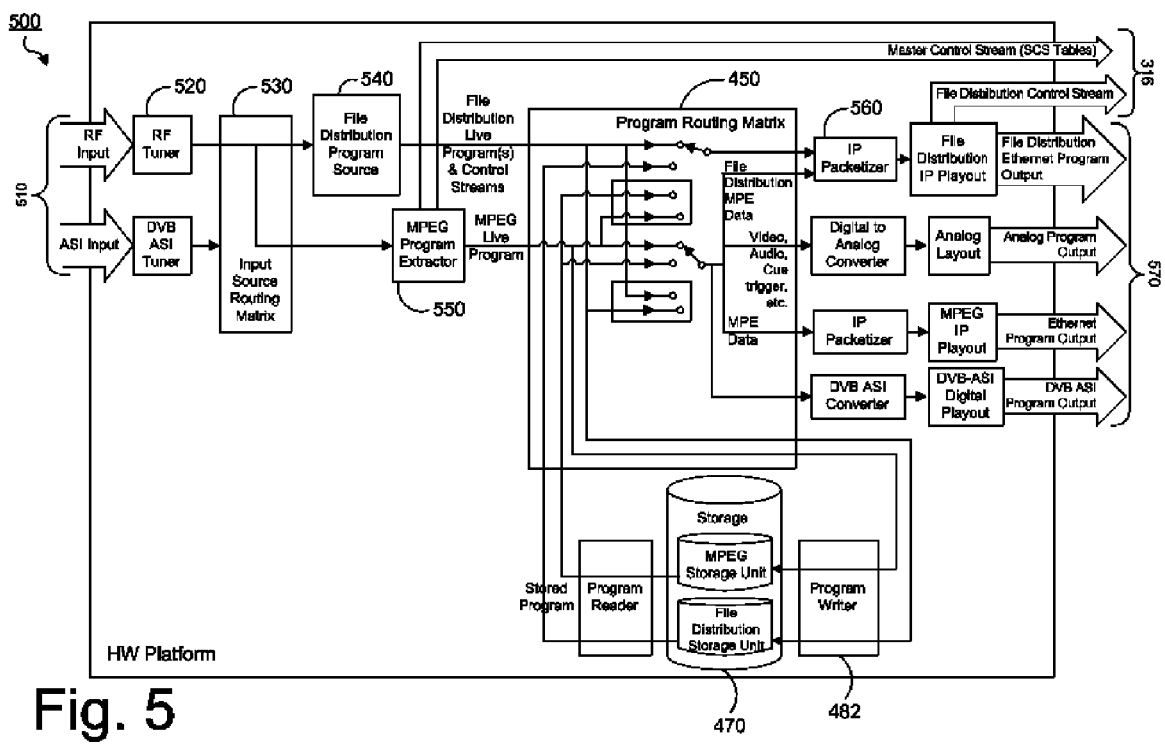
FIG. 5 illustrates a more detailed embodiment of the hardware platform for the decoder of FIG. 3.

FIG. 5 illustrates one embodiment of another decoder hardware platform 500. The inputs can be multiple satellite RF input sources with DVB complaint PSI/SI streams or an ASI input. The tuners 520 can tune among the inputs to provide a single compliant transport stream from a carrier, which can be used to control tuner operation. The input source routing matrix 530 is hardwired to provide the DVB compliant transport stream from the tuners 520 to all the program sources. Live programs can be provided by the transport stream. Each is identified by its DVB service ID and has a corresponding program mat table (PMT). One program source is an MPEG program extractor 550. It is only capable of extraction and provides the master control stream. The MPEG program extractor 550 provides live MPEG program content used for playout and storage. It is not directly available to the decoder operating system 320 for processing. The MPEG program extractor 550 can provide file distribution control streams if the PMT of the MPEG program carriers MPE data targeted for file distribution. A second program source is a file distribution program extractor 540. It is capable of both extraction and injection of program content. The file distribution targeted MPE data streams are passed directly to the IP Packetizer 560. The file distribution streams may contain control data, playout content and storage content all of which are passed to the file distribution client residing in the decoder OS. MPEG content in the PMT is ignored. The file distribution client can write playout content directly to the IP Packetizer 560 for playout. The file distribution client can also inject storage content to be stored.

There are preferably four output playouts 570. Three for MPEG programs and one for file distribution programs. The MPEG program playout includes analog, Ethernet, and digital. The analog program playout is used to pay out programs presented on output ports that are intended to be connected to peripheral equipment that is used to display or record the program such as TV, radio tuner, VCR, etc. The Ethernet program playout is used to stream the IP data received in MPE format. The digital program playout is used to play out programs in the form of MPEG transport packets on a DVB ASI output. The file distribution program playout is of file distribution content on Ethernet. Translation of file distribution programs for MPEG playout and vice versa is also possible.

The decoder hardware platform 500 also has a storage system 470. If only one program may be written into storage at a time, multiple requests to write to storage will be performed in sequence. If only one program may be read from storage at a time then multiple requests to read from storage will be disallowed. Storage will be supported with a hard disk drive with a partition for MPEG programs and a partition for file distribution programs. The program routing matrix 450 will support the routing of MPEG live or stored programs to MPEG playout outputs and the MPEG storage unit. The program routing matrix 450 will also support the routing of file distribution live or stored programs to file distribution playout outputs and the file distribution storage unit.

Figure 6:
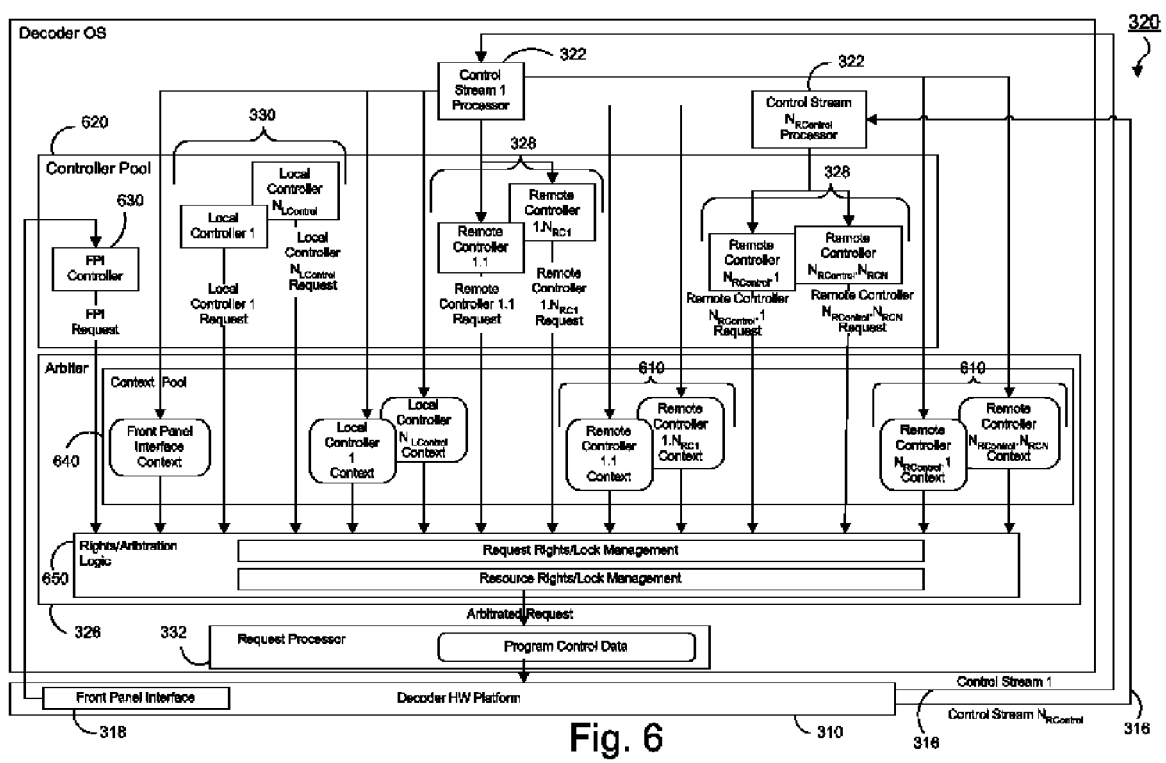
FIG. 6 illustrates one embodiment of a software platform for the decoder of FIG. 3.

FIG. 6 illustrates one embodiment of the decoder software platform 320 in more detail. There is a control stream processor 322 for each control stream. In one embodiment, the two control streams would be a global control data stream and a file distribution control stream. Each control stream processor 322 is capable of extracting remote control requests from the control stream and passing them to the appropriate control stream processor's appropriate remote controller 328. The remote control requests may be segmented for a subset of the decoder population. Each subset will have its own remote controller 328. The control stream processor 322 is capable of extracting any program content present in the control stream and passing it to the appropriate remote controller. A controller pool 620 is an entity that is capable of processing remote control requests and submitting the resulting decoder requests to the arbiter 326, and processing program content and submitting the resulting decoder requests to the arbiter 326. The controller pool 620 may contain one FPI controller 630 to handle requests originating from the decoder's front panel interface 318, one or more local controllers 330 used to handle requests from any users locally logged into the decoder, and one or more remote controllers 328 used to handle any requests extracted from the control streams. The arbiter 326 has a context pool 640. Each controller in the controller pool 620 must have a corresponding context in the context pool 640. Rights/arbitration logic 650 makes use of the contexts in the context pool 640 to determine if a controller has the rights to issue the request or to access the necessary resources to perform the request. The rights/arbitration logic 650 also arbitrates controller conflicts. A controller conflict can be detected by determining if an operation needed to be performed by a request has been locked by a request form another controller or a resource needed by a request has been locked by a request from another controller. A controller conflict can be resolved by determining relative priorities of the conflicting requests or by determining interruptability of existing requests. A higher priority request may override another request if the outstanding request is interruptible. The rights/arbitration logic 650 also produces an arbitrated request that contains only changes that the controller has rights for. A request processor 332 processes the arbitrated request to produce the program control data used to drive the decoder hardware platform 310.

It should be emphasized that the above-described embodiments of the invention are merely possible examples, among others, of the implementations, setting forth a clear understanding of the principles of the invention. Many variations and modifications may be made to the above-described embodiments of the invention without departing substantially from the principles of the invention. All such modifications and variations are intended to be included herein within the scope of the disclosure and invention and protected by the following claims. In addition, the scope of the invention includes embodying the functionality of the embodiments of the invention in logic embodied in hardware and/or software-configured mediums.

What is claimed is:

1. An uplink system for a broadband communications system to transmit encoded transport streams to a headend facility including a plurality of decoders for decoding the received encoded transport streams, wherein the decoders each include a storage system for storing data corresponding to the decoded transport streams, the uplink system comprising:

a stream unit for forming an encoded transport stream for transmission to the headend facility; and at least one control server to inject into the transport stream formed by the stream unit at least one global control stream common to the plurality of decoders at the headend facility to control operation of each of the plurality of decoders simultaneously to perform desired actions in response to receiving and being targeted by the at least one global control stream, wherein the at least one global control stream comprises a plurality of subscriber group codes, each respective decoder processing each given group code in the plurality of subscriber group codes to determine if a match exists between the given group code relative to decoder group codes stored in memory of the respective decoder and each respective decoder having a current targeted state that is changed to targeted or not targeted if the given group code matches the decoder group codes stored in memory such that each respective decoder has a resulting target state this is either targeted or not targeted after processing each of the plurality of subscriber group codes, each respective decoder performing the desired actions specified in the global control stream if its resulting target state is targeted and not performing the desired actions specified in the global control stream if its resulting target state is not targeted, wherein the desired actions relate to one or more of control of tuning of the each respective targeted decoder, control of the storage systems of each respective targeted decoder, and control of service mapping at each respective targeted decoder.

2. The uplink system of claim 1 wherein a control server is adapted to transmit an entitlement management message (EMM) to at least one specific decoder to direct the specific decoder to implement an action.

3. The uplink system of claim 2 wherein a global control stream blocks or unblocks the plurality of decoders and the EMM blocks or unblocks the at least one specific decoder.

4. The uplink system of claim 2 wherein the at least one specific decoder belongs to the plurality of decoders.

5. The uplink system of claim 1 wherein the at least one global control stream comprises at least one of the following: an event control stream to control tuning of the plurality of decoders, a storage control stream to control the storage systems of the plurality of decoders, and a disaster recovery stream to control service mapping at the plurality of decoders.

6. The uplink system of claim 5 wherein the storage control comprises at least one of the following: an acquisition control table for scheduling of content to be recorded, a content control table for listing all content stored in one of the plurality of the decoders, and a playout control table for providing a schedule of content to be played out.

7. The uplink system of claim 1 further comprising a plurality of control servers for controlling the plurality of decoders at the headend facility by injecting their respective global control data streams into a transport stream.

8. The uplink system of claim 6 wherein the transport stream comprises at least one program stream of packetized elementary streams multiplexed with the storage control stream.

9. The uplink system of claim 1 wherein the transport stream comprises at least one program stream of packetized elementary streams and at least one global control stream is a global event control stream multiplexed with the at least one program stream to define the transport stream, the global event control stream for simultaneously controlling the decoders and comprising an event control table for directing at least one decoder to retune.

10. The uplink system of claim 1 wherein the transport stream comprises at least one program stream of packetized elementary streams and at least one global control stream is a global disaster recovery control stream multiplexed with the at least one program stream to define the transport stream, the global disaster recovery control stream for simultaneously controlling the decoders and comprising instructions to tune to an alternative channel mapped from a previously tuned signal as a result of the loss of the previously tuned signal.

11. The uplink system of claim 1 wherein the transport stream comprises at least one program stream of packetized elementary streams and at least one of a global storage control stream, a global event control stream and a global disaster recovery control stream are multiplexed with the at least one program stream to define the transport stream.

12. The uplink system of claim 1, wherein the at least one global control stream comprises:
 a first loop that includes the subscriber group codes; and
 a second loop that includes a list of the desired actions that are to be performed by each of the plurality of decodes having a resulting target state that is targeted.

13. An uplink system for a broadband communications system to transmit transport streams to a headend facility including a plurality of decoders for decoding the received transport streams, wherein the decoders each include a storage system for storing data corresponding to the decoded transport streams, the uplink system comprising:
 a data controller for forming a transport stream for transmission to the headend facility, wherein the transport stream includes at least one program stream of packetized elementary streams and a global storage control stream multiplexed with the at least one program stream to define the transport stream, the global storage control stream simultaneously controlling the plurality of storage enabled decoders at the headend facility in response to being targeted by the global storage control stream, wherein the global storage control stream comprises a plurality of subscriber group codes, each respective decoder processing each given group code in the plurality of subscriber group codes to determine if a match exists between the given group code relative to decoder group codes stored in memory of the respective decoder and each respective decoder having a current targeted state that is changed to targeted or not targeted if the given group code matches the decoder group codes stored in memory such that each respective decoder has a resulting target state this is either targeted or not targeted after processing each of the plurality of subscriber group codes, each respective decoder performing the desired actions specified in the global control stream if its resulting target state is targeted and not performing the desired actions specified in the global control stream if its resulting target state is not targeted, the global storage control stream comprising at least one of the following: an acquisition control table for providing a schedule of contents to be recorded, a content control table for providing a list of all contents that exist on at least one of the decoders, and a playout control table for providing a schedule of content that is to be played out.

14. An uplink system for a broadband communications system to transmit transport streams to a headend facility including a plurality of decoders for decoding the received transport streams, wherein the decoders each include a storage system for storing data corresponding to the decoded transport streams the uplink system comprising:
 a data controller for forming a transport stream for transmission to the headend facility, wherein the transport stream includes at least one program stream of packetized elementary streams and a global event control stream multiplexed with the at least one program stream to define the transport stream, the global event control stream simultaneously controlling the plurality of decoders at the headend facility, wherein the global event control stream comprises a first loop and a second loop, wherein the first loop further comprises a plurality of descriptors, each of the plurality of descriptors comprising a plurality of subscriber group codes, each respective decoder processing each of the plurality of descriptors and, based on the processing, modifying a current target state thereof if the subscriber groups codes in each given descriptor matches decoder group codes stored in memory of the respective decoder, each respective decoder having a resulting target state this is either targeted or not targeted after the processing of each of the plurality of descriptors in the first loop, the global second loop comprising an event control table for directing each of the decoders to retune its resulting target state that is targeted, and each of the decoders not performing the retune if its resulting target state is not targeted.

15. An uplink system for a broadband communications system to transmit transport streams to a headend facility including a plurality of decoders for decoding the receiving transport streams, wherein the decoders each include a storage system for storing data corresponding to the decoded transport streams, the uplink system comprising:
 a data controller for forming a transport stream for transmission to the headend facility, wherein the transport stream includes at least one program stream of packetized elementary streams and a global disaster recovery control stream multiplexed with the at least one program stream to define the transport stream, the global disaster recovery control stream simultaneously controlling the plurality of decoders at the headend facility, wherein the global disaster recovery control stream comprises a first loop and a second loop, wherein the first boo further comprises a plurality of descriptors, each of the plurality of descriptors comprising a plurality of subscriber group codes, each respective decoder processing each of the plurality of descriptors and, based on the Processing, modifying a current target state thereof if the subscriber groups codes in each given descriptor matches decoder group codes stored in memory of the respective decoder such that each respective decoder has a resulting target state this is either targeted or not targeted after the processing of each of the plurality of descriptors in the first loop, the global disaster recovery control stream comprising instructions to direct each decoder having a resulting target state that is targeted to tune to an alternative channel mapped from a previously tuned signal as a result of the loss of the previously tuned signal.

16. An uplink system for a broadband communications system to transmit transport streams to a headend facility including a plurality of decoders for decoding the received transport streams, wherein the decoders each include a storage system for storing data corresponding to the decoded transport streams the uplink system comprising:

a data controller for forming a transport stream for transmission to the headend facility, wherein the transport stream includes at least one program stream of packetized elementary streams, and a plurality of global control streams multiplexed with the at least one program stream to define the transport stream, each of the global control streams for simultaneously controlling the plurality of decoders, controlling the storage systems of the plurality of decoders, and controlling service mapping at the plurality of decoders, wherein each of global control streams comprises a first loop and a second loop, wherein the first loop further comprises a plurality of descriptors, each of the plurality of descriptors comprising a plurality of subscriber group codes, each respective decoder Processing each of the plurality of descriptors and modifying a current target state thereof based on whether the subscriber groups codes in each given descriptor matches decoder group codes stored in memory of the respective decoder such that each respective decoder has a resulting target state this is either targeted or not targeted after processing each of the plurality of descriptors in the first loop, each respective decoder performing the desired actions specified in the second loop if its resulting target state is targeted and not performing the desired actions specified in the second loon if its resulting target state is not targeted.

17. The uplink system of claim 16 wherein the plurality of global control streams includes a global storage control stream comprising at least one of the following:

an acquisition control table for providing a schedule of contents to be recorded by the respective targeted plurality of decoders, a content control table for providing a list of all contents that exist on the respective targeted plurality of decoders, and a playout control table for providing a schedule of content that is to be played out by the respective targeted plurality of decoders.

18. The uplink system of claim 16 wherein the plurality of global control streams includes a global event control stream comprising an event control table for directing the respective targeted plurality of decoders to retune.

19. The uplink system of claim 16 wherein said plurality of global control streams includes a global disaster recovery control stream comprising instructions for the respective targeted plurality of decoders to tune to an alternative channel mapped from a previously tuned signal as a result of the loss of the previously tuned signal.

20. The uplink system of claim 16 wherein at least two of the global control streams have a common PID.

21. The uplink system of claim 20 wherein the plurality of global control streams includes a global storage control stream and a global event control stream having a common PID.

* * * * *